United States Patent
Brewer et al.

(10) Patent No.: US 8,234,143 B1
(45) Date of Patent: Jul. 31, 2012

(54) METHOD AND SYSTEM FOR AUTOMATED RESOURCE SKILLSET MATCHING

(75) Inventors: Jordan Brewer, Mountain View, CA (US); James Shaw, Mountain View, CA (US); Steven A. Sholtis, El Dorado Hills, CA (US); James R. Nelson, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 449 days.

(21) Appl. No.: 12/210,067

(22) Filed: Sep. 12, 2008

(51) Int. Cl.
*G06Q 10/00* (2012.01)

(52) U.S. Cl. ............... 705/7.14; 705/7.12; 705/7.13; 705/7.17; 705/7.23; 705/7.25

(58) Field of Classification Search ............ None
See application file for complete search history.

(56) References Cited

U.S. PATENT DOCUMENTS

| | | | | |
|---|---|---|---|---|
| 5,913,201 | A * | 6/1999 | Kocur | 705/7.17 |
| 7,051,036 | B2 * | 5/2006 | Rosnow et al. | 707/723 |
| 2002/0029213 | A1 * | 3/2002 | Borissov et al. | 707/7 |
| 2002/0156668 | A1 * | 10/2002 | Morrow et al. | 705/8 |
| 2002/0198766 | A1 * | 12/2002 | Magrino et al. | 705/11 |
| 2003/0083912 | A1 * | 5/2003 | Covington et al. | 705/7 |
| 2003/0126141 | A1 * | 7/2003 | Hassman et al. | 707/100 |
| 2003/0130886 | A1 * | 7/2003 | Calderaro et al. | 705/11 |
| 2003/0177049 | A1 * | 9/2003 | Honda et al. | 705/8 |
| 2004/0054565 | A1 * | 3/2004 | Nemecek et al. | 705/7 |
| 2004/0267595 | A1 * | 12/2004 | Woodings et al. | 705/9 |
| 2005/0004825 | A1 * | 1/2005 | Ehrler et al. | 705/8 |
| 2005/0222899 | A1 * | 10/2005 | Varadarajan et al. | 705/11 |
| 2006/0047556 | A1 * | 3/2006 | Lang et al. | 705/9 |
| 2006/0053043 | A1 * | 3/2006 | Clarke | 705/8 |
| 2006/0167732 | A1 * | 7/2006 | Ricketts | 705/8 |
| 2007/0094061 | A1 * | 4/2007 | Hu et al. | 705/8 |
| 2007/0156480 | A1 * | 7/2007 | Jain et al. | 705/8 |
| 2008/0243575 | A1 * | 10/2008 | Weinberger | 705/8 |
| 2009/0037246 | A1 * | 2/2009 | Taylor et al. | 705/8 |
| 2009/0222310 | A1 * | 9/2009 | Vollmer et al. | 705/8 |

OTHER PUBLICATIONS

Niederman, "Staffing and management of e-commerce programs and projects" (2005) ACM. Proceedings of the 2005 ACM SIGMIS CPR conference on Computer personnel research. p. 128-138.*

* cited by examiner

*Primary Examiner* — Lynda Jasmin
*Assistant Examiner* — Sujay Koneru
(74) *Attorney, Agent, or Firm* — Osha Liang LLP

(57) ABSTRACT

A method for staffing a project, involving receiving a staffing request for the project, wherein the staffing request includes at least one attribute of the project, and wherein the project is a task to be completed internally by an organization, automatically searching a plurality of user profiles to identify a subset of user profiles from the plurality of user profiles, wherein user data stored in each of the subset of user profiles matches the at least one attribute of the project, displaying the subset of user profiles, and receiving a selection of at least one user profile from the subset of user profiles for staffing the project.

15 Claims, 9 Drawing Sheets

Create a Project 400

Technology: flex
402

Project Duration: Mar08 – Jun08
404

Find Resources

METHOD AND SYSTEM FOR AUTOMATED RESOURCE SKILLSET MATCHING

BACKGROUND

Typically, a large organization, such as a company or corporation, includes several divisions/departments, each of which are working on one or more projects simultaneously. For example, Department A may be working on Project A, while the employees in Department B may be working on a different project, Project B. Often times, each project is a small aspect of the overall product or service that the organization provides.

Generally, an organization that works on a project basis includes an internal system for staffing and gathering resources for a project that the organization is currently working on or wishes to begin working on. As projects are created and setup within the company, a significant effort on the part of management is made to find resources available to staff the project. For example, such efforts may include setting up meetings with various managers to determine who might be available to start working on a project, arranging dates, and determining employees level of skill and/or interest in the various aspects of a project. Often times, the routine tasks that management performs to staff a project are time consuming processes that can be costly in terms of time to get a new project running and management man hours. Moreover, project staffing typically occurs on a per-department or per-division basis, where projects are staffed by team members in a particular department or division of the organization.

To aid management with staffing for new projects, project management software programs have been created. Typically, these software programs are designed to assist project managers in developing plans, assigning resources to tasks, tracking progress, managing budgets, and analyzing workloads for one or more projects. In most cases, such software programs require managers to manually assign resources to projects. Based on the resources assigned, the project management software calculates estimated costs for the project.

SUMMARY

In general, in one aspect, the invention relates to a method for staffing a project, comprising receiving a staffing request for the project, wherein the staffing request comprises at least one attribute of the project, and wherein the project is a task to be completed internally by an organization, automatically searching a plurality of user profiles to identify a subset of user profiles from the plurality of user profiles, wherein user data stored in each of the subset of user profiles matches the at least one attribute of the project, displaying the subset of user profiles, and receiving a selection of at least one user profile from the subset of user profiles for staffing the project.

In general, in one aspect, the invention relates to a system for providing a project staffing service, comprising a repository configured to store, on behalf of an organization, a plurality of user profiles comprising user data, and a plurality of project profiles comprising project data, and a server communicatively coupled to the repository and configured to receive a staffing request for a project from the organization, wherein the staffing request comprises at least one attribute of the project, and wherein the project is a task to be completed internally by the organization, automatically search the plurality of user profiles to identify a subset of user profiles from the plurality of user profiles, wherein user data stored in each of the subset of user profiles matches the at least one attribute of the project, display the subset of user profiles, and receive a selection of at least one user profile from the subset of user profiles for staffing the project, wherein the server is remotely access by the organization to staff the project.

In general, in one aspect, the invention relates to a computer readable medium for staffing a project comprising software instructions executed by a processor to receive a staffing request for the project, wherein the staffing request comprises at least one attribute of the project, and wherein the project is a task to be completed internally by an organization, automatically search a plurality of user profiles to identify a subset of user profiles from the plurality of user profiles, wherein user data stored in each of the subset of user profiles matches the at least one attribute of the project, display the subset of user profiles, and receive a selection of at least one user profile from the subset of user profiles for staffing the project.

Other aspects of the invention will be apparent from the following description and the appended claims.

BRIEF DESCRIPTION OF DRAWINGS

FIGS. 4-5 show example screen shots in accordance with one or more embodiments of the invention.

DETAILED DESCRIPTION

Figure 1:
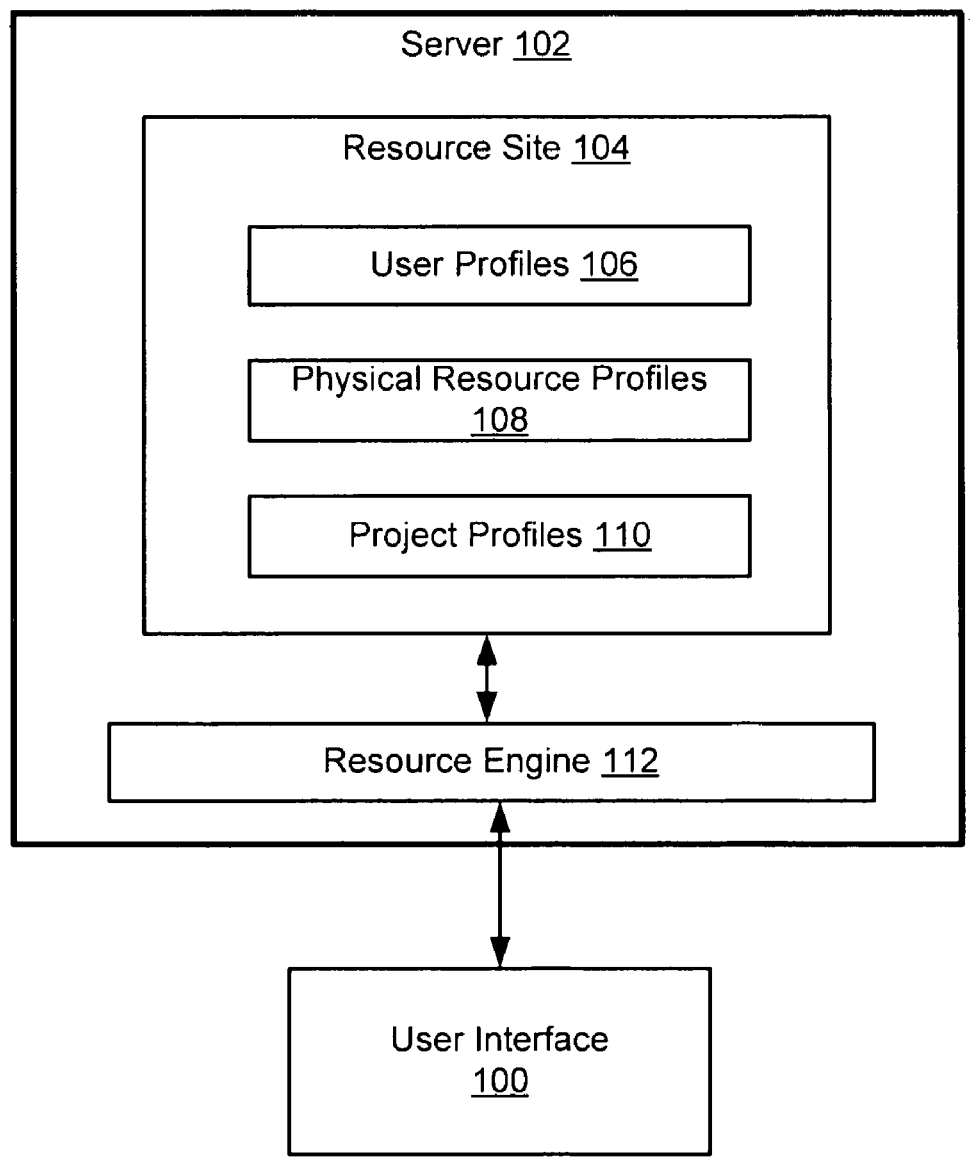
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to match skill sets and resources for a project. More specifically, embodiments of the invention leverage employee data across an organization to staff a new project.

FIG. 1 shows a system for matching skill set and resources to a project in accordance with one or more embodiments of the invention. As shown in FIG. 1, the system includes a user interface (100), a server (102), a resource site (104), and a resource engine (112). Each of the aforementioned components of the system is described in detail below.

In one or more embodiments of the invention, the system of FIG. 1 is used to staff a project. A project may be any task that is performed internally within an organization. For example, a project may be software based (e.g., a project involving programming in an object oriented programming language), hardware based (e.g., working with circuitry on a processor chip, logic design for a hardware component, etc.), may be associated with artwork or design for an organization's office space or website, etc. In addition, a project may be a new project, an existing project, and/or a long-term project (e.g., more than 3 months), or short-term project (e.g., less than 3 months). In the case where the organization is broken up into business units, divisions, and/or departments, a project may be associated with a particular business unit, divisions, and/or department of the organization. Alternatively, a project may involve multiple business units, divisions, and/or departments. In one or more embodiments of the invention, an organization may be a small business, a corporation, a non-profit organization, a limited liability partnership (such as a law firm), or any other entity that operates on a project-basis. For example, an organization may be a consulting firm that staffs employees on projects that are based in different geographical areas.

One or more embodiments of the invention provide an automated method for identifying resources for a project. In one or more embodiments of the invention, a resource may be a person (e.g., employees of the organization, independent contractors associated with the organization), and/or physical resources, such as physical machines, office space, lab space, a workstation, etc.

Referring to FIG. 1, the user interface (100) may be a graphical user interface (GUI) or a command interface executing on a computing device. The user interface (100) may be executed on any type of computing device, such as a computer, a mobile phone, a personal digital assistant, a media device, etc. In one or more embodiments of the invention, the user interface (100) may be used to create profiles and input profile data in each type of profile (discussed below). Further, the user interface (100) may be used to initiate a search for resources to staff a project. In one or more embodiments of the invention, the user interface (100) may also be configured to display search results matching a request to staff a project. Such results may be displayed in graphical form, or in a data structure, such as a spreadsheet, a list, a table, any combination thereof, and/or any other suitable format for displaying search results. The user interface (100) may be used by anyone who has an interest in locating resources for a project, such as management and/or research and development of the organization.

The user interface (100) is operatively connected to a resource engine (112). In one or more embodiments of the invention, the resource engine provides the business logic to enable the search mechanism to identify and display user profiles and physical resource profiles that match at least one project attribute. Said another way, the resource engine (112) includes capability to locate resource profiles stored in the resource site (104) and provide the located resource profiles to a user using the user interface (100).

Continuing with FIG. 1, the resource engine (112) is operatively connected to a resource site (104). The resource site may be a database, a web application configured to store data, a web site internal to the organization (e.g., an intranet site), or any other type of repository. In one or more embodiments of the invention, the resource site (104) is configured to store resource profiles and project profiles (110). Resource profiles may include user profiles (106) and physical resource profiles (108). The different types of profiles are discussed in detail below. In one or more embodiments of the invention, there may be multiple resource sites configured to store resource profiles. Each resource site may be located remotely from each other or in the same physical vicinity. For example, each resource site may operate on one node of a plurality of nodes in a network system.

The resource engine (112) and resource site (104) are both executed on a server (102). The server (102) may be an application server, a web server, or any other type of suitable server. Further, the server (102) may be associated directly with the organization, or may be associated with a third-party service provider that provides staffing services to various organizations. In this case, the third-party service provider may store and manage the organization's resource data (e.g., resource and project profiles) and the organization may access the server (102) remotely to submit a staffing request for a project.

Figure 2:
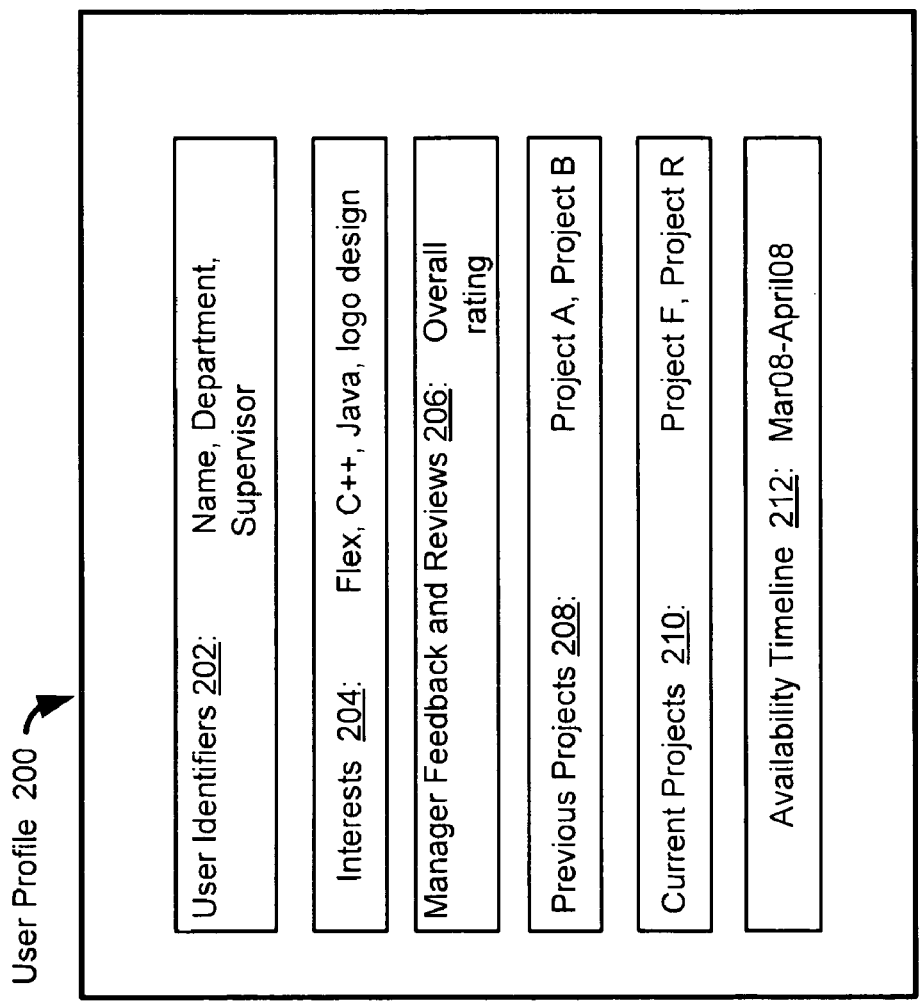
FIGS. 2-3 show example profiles in accordance with one or more embodiments of the invention.

FIG. 2 shows an example of a user profile (200) in accordance with one or more embodiments of the invention. In one or more embodiments of the invention, a user profile is configured to store data associated with a user (e.g., an employee of the organization, an independent contractor associated with the organization, etc.). In one or more embodiments of the invention, the user profile data is related to projects. For example, the user profile (200) shown in FIG. 2, includes user identifiers (202), interests (204), manager feedback and performance reviews (206), previous projects (208), current projects (210), and an availability timeline (212). User identifiers (202) may be any information that uniquely identifies the user corresponding to the user profile. For example, the user's name, department, and/or supervisor may be included as user identifiers. Alternatively, user identifiers may include an employee ID, a social security number, a driver's license number, or any other suitable identifier.

In one or more embodiments of the invention, the interests (204) associated with a user may be technology areas in which the user is interested. The example user profile (200) shows technology areas flex, C++, and Java™ (Java is a trademark of Sun Microsystems, Inc., California, USA). Alternatively, interests may also include non-technical interests within an organization, such as design/art work, event planning for the organization, committee/conference involvement, etc. Thus, interests (204) may include any subject matter which the user is interested in working on.

In one or more embodiments of the invention, manager feedback and performance reviews (206) may also be stored in a user profile. In one or more embodiments of the invention, feedback and review information may be associated with previously completed projects and current projects. Alternatively, feedback and/or review information may provide an overall rating of the user's performance in several areas, such as technical competence in particular technology areas, ability to be a team player, attitude, etc.

Continuing with FIG. 2, each user profile stores previous projects (208) completed by the user and current projects (210) on which the user is presently working. In one or more embodiments of the invention, a project name or identifier listed as a previously completed project may be linked to a project profile for that project. For example, in FIG. 2, Project A is listed as a previously completed project by the user. In this case, selecting "Project A" while viewing the user profile (200) may result in the displaying of the project profile for Project A. Similarly, Project B, Project F, and Project R may also be linked to respective project profiles (discussed below in FIG. 3). Further, although not shown in FIG. 2, a user may prioritize interests (204) and/or current projects, and such priority information may also be included in the user profile (200).

The user profile (200) also includes the user's availability timeline (212). The availability timeline (212) provides information about when the user is available (i.e., has bandwidth) to work on a project. Thus, if a user is currently staffed on a project that has a duration of three months, then the next three months in the user's availability timeline may be shown as blocked or busy. Those skilled in the art will appreciate that a user may work on or be staffed on more than one project at a time.

In one or more embodiments of the invention, a user profile may be created, populated, and updated manually by a user each time the user's project experience changes. Alternatively, as a user is staffed on multiple projects, the user's profile may be automatically populated with information associated with each project. Thus, the system of the present invention may be completely automated, where profiles are automatically updated based on the periodic gathering of project information. Alternatively, keeping user profiles updated may be a user-initiated, manual process. Those skilled in the art will appreciate that people and/or entities other than the user can update and/or modify a user profile associated with a user. For example, to include performance reviews and/or feedback, management may modify a user's profile to reflect a user's performance in a most recent project and/or provide an overall rating of the user's performance.

Further, those skilled in the art will appreciate that a user profile may include more information than that shown in FIG. 2. For example, a user profile may include skill levels within each area of technology that the user is familiar with, recognitions that the organization has attributed to the user, such as the user's technical status, awards, published articles, presentations, or any other suitable information that may be used to determine whether the user should be selected for a particular project.

Figure 3:
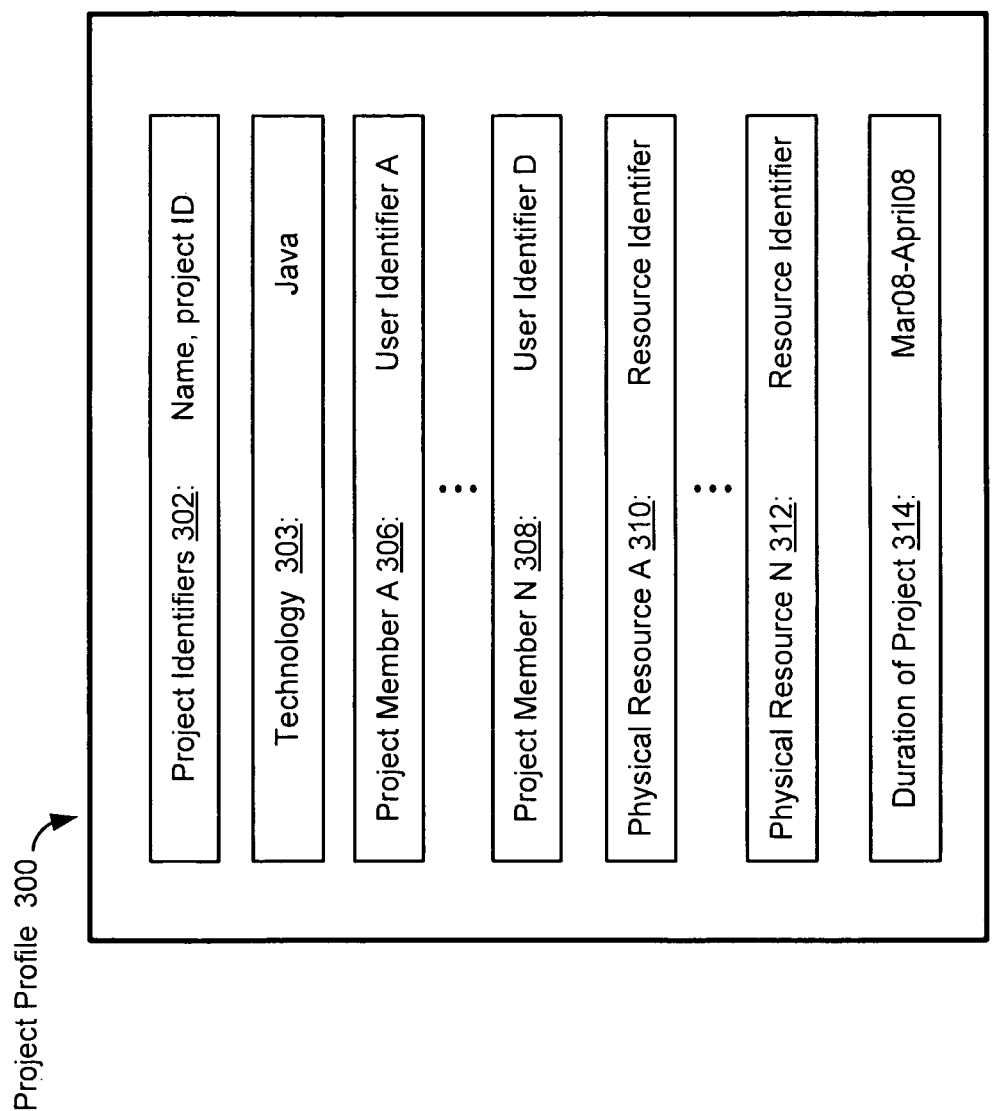

FIG. 3 shows a project profile (300) in accordance with one or more embodiments of the invention. Each project profile (300) includes project identifiers (302) that uniquely identify the project. Such project identifiers may include an internal code name, a project ID number, or any other suitable identifier. The project profile (300) also includes the technology (304) area associated with the project. For example, a project may be focused on Java™, security, oilfield/energy, art/design, or any other area of expertise required/utilized by the member in the project.

In one or more embodiments of the invention, each project profile (300) includes the project members (Project Member A (306), Project Member N (308)) staffed on the project, and the physical resources (Physical Resource A (310), Physical Resource N (312)) staffed on the project. In one or more embodiments of the invention, each project member entry includes the user identifier of the project member, which links back to the user profile for that project member. Similarly, each physical resource links back to the physical resource profile for that physical resource. The project profile also includes the duration of the project (314). For example, for the project profile shown in FIG. 3, the duration of the project is one month, i.e., from March 2008 to April 2008.

Those skilled in the art will appreciate that, although not shown, a physical resource profile (FIG. 1, 108) may include similar information as a user profile. For example, each physical resource profile may include a physical resource identifier, the previous projects in which the physical resource was used, the current projects the physical resources is staffed on, feedback regarding the physical resource's performance, and the availability timeline of the physical resource.

FIG. 4 shows a screen shot (400) for submitted a staffing request to the system described in FIG. 1 in accordance with one or more embodiments of the invention. In one or more embodiments of the invention, a manager or developer starting a new project or looking to staff an existing project may, via a user interface, inputs project attributes for the project. In one or more embodiments of the invention, the project attributes are the attributes upon which the search is to be performed. Thus, the attributes of the project that are provided to the system are the attributes that the system is going to match in various resource profiles. For example, the screen shot of FIG. 4 shows project attributes "technology" (402) and "project duration" (404). Upon inputting the project attributes, the "Find Resources" button (406) is selected, and the system searches the resource site to obtain resource profiles that match the attribute input for the project. In this case, resource profiles that mention the technology Flex, either in areas of interest or in previous or current projects, and/or that have availability during the project duration are matched to the project attribute.

Figure 5:
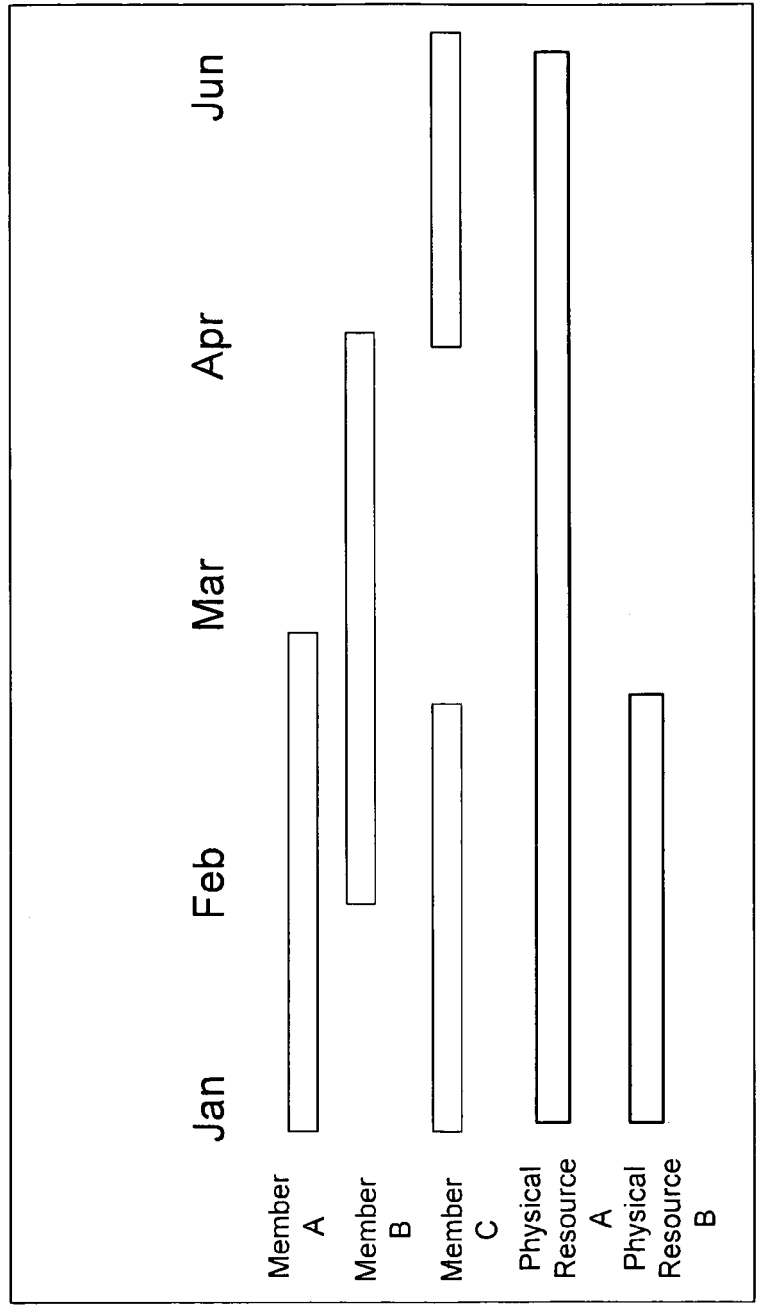

FIG. 5 shows an example of a search result that may be displayed by the system in accordance with one or more embodiments of the invention. More specifically, the search results of FIG. 5 correspond to the staffing request of FIG. 4. Thus, in the example screen shot (500) of FIG. 5, the results shown represent identified resources for Project X, based on Project X's attributes of Flex technology and a duration from March 2008 to April 2008. In this scenario, Members A, B, and C, and physical resources A and B all matched the Flex area of technology shown as a project attribute in FIG. 4. More specifically, the user profiles for Members A, B, and C, may have included Flex in previous projects or areas of interest. The physical resource profiles for physical resources A and B may have included Flex in previous projects on which the physical resources were used. In FIG. 5, Member A is staffed on one or more projects from January to March, but is available to work on Project X from March to April. Member C is also available from March to April. However, Member B is staffed on projects in March and April, and therefore, may not be available for Project X. Physical Resource A also has no bandwidth from March to April, whereas Physical Resource B is available. Based on the search results shown, a manager or developer staffing Project X may choose Members A and C, and Physical Resource B to be staffed on Project X.

Figure 6:
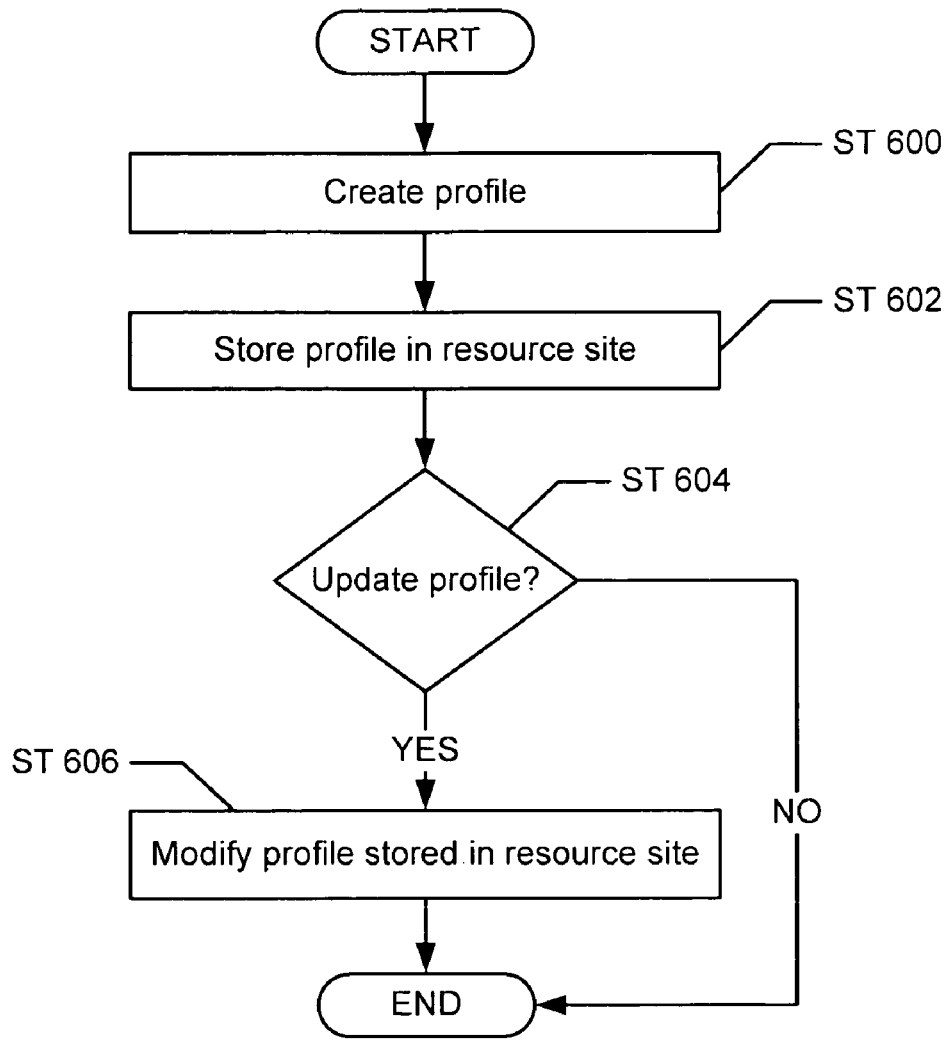
FIGS. 6-8 show flow charts in accordance with one or more embodiments of the invention.

FIG. 6 shows a flowchart for setting up profiles in the resource site in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Accordingly, the specific arrangement of steps shown in FIG. 6 is not meant to limit the scope of the invention.

Initially, profiles are created in the resource site (ST 600). Created profiles may include user profiles, physical resource profiles (such as profiles for computing machines and/or systems), and project profiles. Resource profiles may be created by system administrators or department heads for the department with which the physical resource is associated. User profiles may be created by employees and/or independent contractor of the organization. Alternatively, in one or more embodiments of the invention, user profiles may be created automatically when a user is hired with the organization, and may be populated in an automated fashion, as employees/independent contractors work on various projects within the organization. Next, each created profile is stored in the resource site (ST 602).

After a profile is created, a decision is made as to whether the profile needs to be updated with new information (ST 604). If the profile needs to be updated, then the profile stored in the resource site is modified (ST 606). For example, when a particular employee of the organization is selected to be staffed on a project, the employee's user profile may be updated to reflect the particulars of the project, such as the technology area of the project, the timeframe/duration of the project, etc. In this case, the selection of the employee's user profile may trigger an automatic update to the user's profile. Alternatively, in one or more embodiment of the invention, a user may manually update his/her user profile, for example, when the user decides to add/delete areas of interest, add a previous or current project that the user is working on, update the availability/bandwidth specified in the user profile based on vacation dates, etc. In yet another embodiment of the invention, management may update/modify user profiles based on feedback and/or performance review information after the user has completed work on a project. Alternatively, if the profile does not need to be updated (ST 604), then the process ends.

Figure 7:
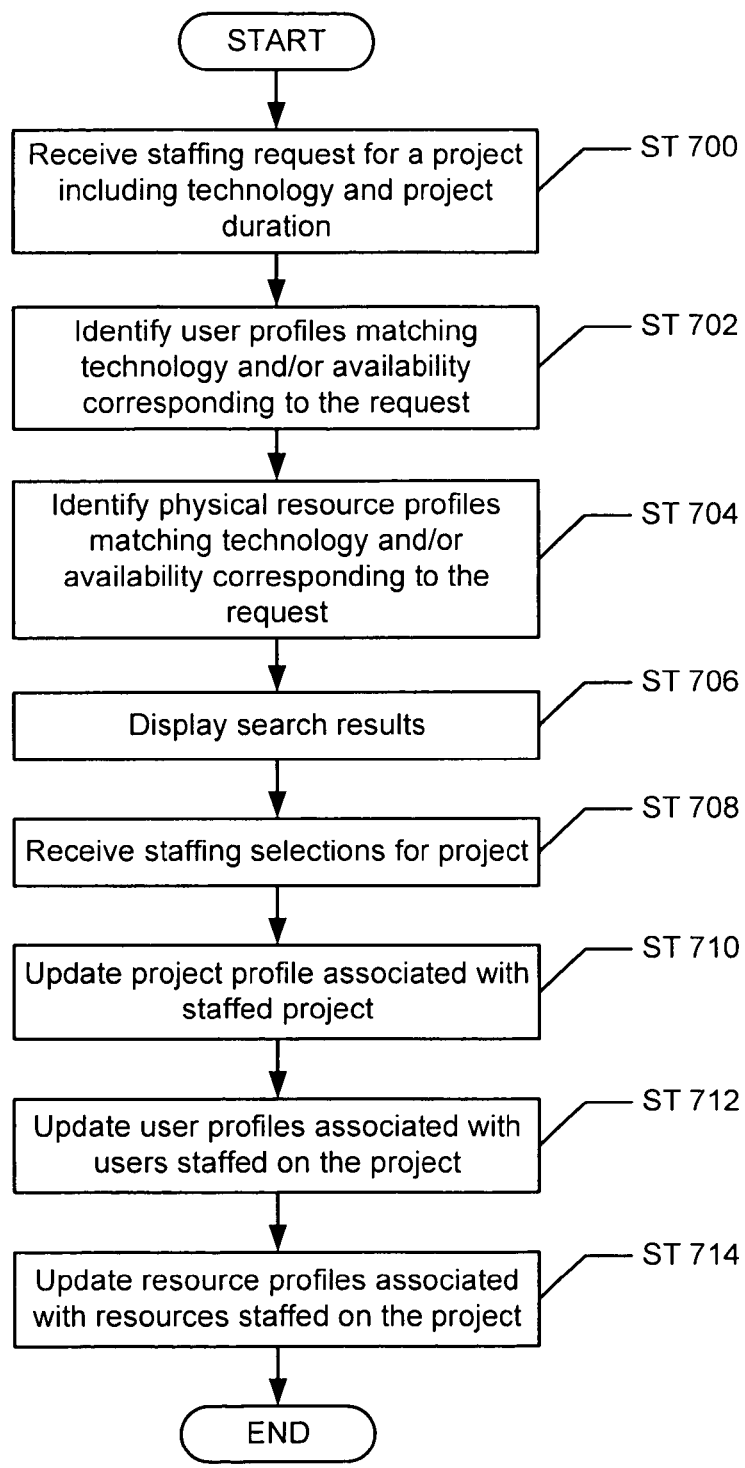

FIG. 7 shows a flowchart for staffing a project in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Accordingly, the specific arrangement of steps shown in FIG. 7 is not meant to limit the scope of the invention.

Specifically, FIG. 7 illustrates a flow chart from the perspective of a server configured to provide a service for staffing projects to an organization. Initially, a staffing request for a project is received (ST 700). In one or more embodiments of the invention, the staffing request includes the technology area in which the project is based, and the project duration. For example, the staffing request may specify that the project is based in PeopleSoft® and has a duration of 2 months (PeopleSoft is a registered trademark owned by PeopleSoft, Inc.). Subsequently, the system identifies user profiles matching the technology and/or the availability corresponding to the project staffing request (ST 702). In one or more embodiments of the invention, the system searches the resource site to identify user profiles across business units, departments, and/or divisions of the organization, to find the user profiles that match the staffing request attributes. In one or more embodiments of the invention, matching user profiles may include one or both of the staffing request attributes (i.e., technology area and/or project duration).

Further, those skilled in the art will appreciate that the staffing request is not limited to specifying only project duration and/or technology area. Rather, in one or more embodiments of the invention, the project staffing request may also specify other project attributes of interest to the manager/developer staffing the project. For example, a manager may be interested in staffing the same project members that were staffed on a previous similar project or a previous project that was very successful. In this case, the manager may submit a staffing request that specifies the previous project name, and user profiles matching the previous project name attribute may be identified by the system. Those skilled in the art will further appreciate that any portion of a user profile may match the project attributes specified in the staffing request. For example, in one or more embodiments of the invention, the technology area specified in a staffing request may match an interest area that a user associated with a user profile has specified. Alternatively, the technology area may match a technology area associated with a previous project the user corresponding to a user profile has worked on.

Continuing with FIG. 7, in addition to identifying user profiles that match the staffing request, the system also identifies physical resource profiles matching the technology area and/or the availability corresponding to the staffing request (ST 704). Upon identifying the resource profiles that match the staffing request, the system displays the search results (ST 706). As described above, the search results may be displayed in a variety of ways including graphically, in a data structure such as a list or table, or any other suitable display method for displaying resource profiles.

Next, the system receives the staffing selections for the project (ST 708). More specifically, the system receives the user and physical resource profile selections made by the manager and/or developer that submitted the project staffing request. For example, a manager may select profiles to be staffed on the project by clicking on the user and/or physical resource profile and adding the profile to the project profile for the project (i.e., if a project profile is already created for the project). In one or more embodiments of the invention, although not shown in FIG. 7, the system may send a message to a user associated with a selected user profile, indicating to the user that he/she has been staffed on a project. The message may be in the form of a text message, an e-mail message, an internal memo, etc.

At this stage, when staffing selections have been made, the system may update the project profile for the project automatically (ST 710). Updating the project profile may include linking the project profile to each of the user profiles and/or physical resource profiles that are staffed on the project, adding metadata associated with the project, such as the project name or unique identifier, etc. Similarly, user profiles and physical resource profiles that are selected to be staffed on the project are updated to reflect the project details in the resource profiles (ST 712 and ST 714). For example, a user profile selected for the project may be modified to include a link to the project profile for the project under "current projects" (if the project starts immediately or soon after staffing selections are made). Alternatively, the area of technology associated with the projects may be added to the skill set section of the user profile. Those skilled in the art will appreciate that physical resource profiles are similarly modified to include the most recent project information. When all associated profiles are up-to-date, the process ends.

Those skilled the art will appreciate that the updating of associated profiles may be performed manually by a system administrator or by the person/entity that submitted the project staffing request. Alternatively, the system may be configured to automatically link all associated profiles together, and update each profile to include the most recent project information. In one or more embodiments of the invention, a message may be sent to a user each time the user profile associated with the user is modified by the system.

Figure 8:
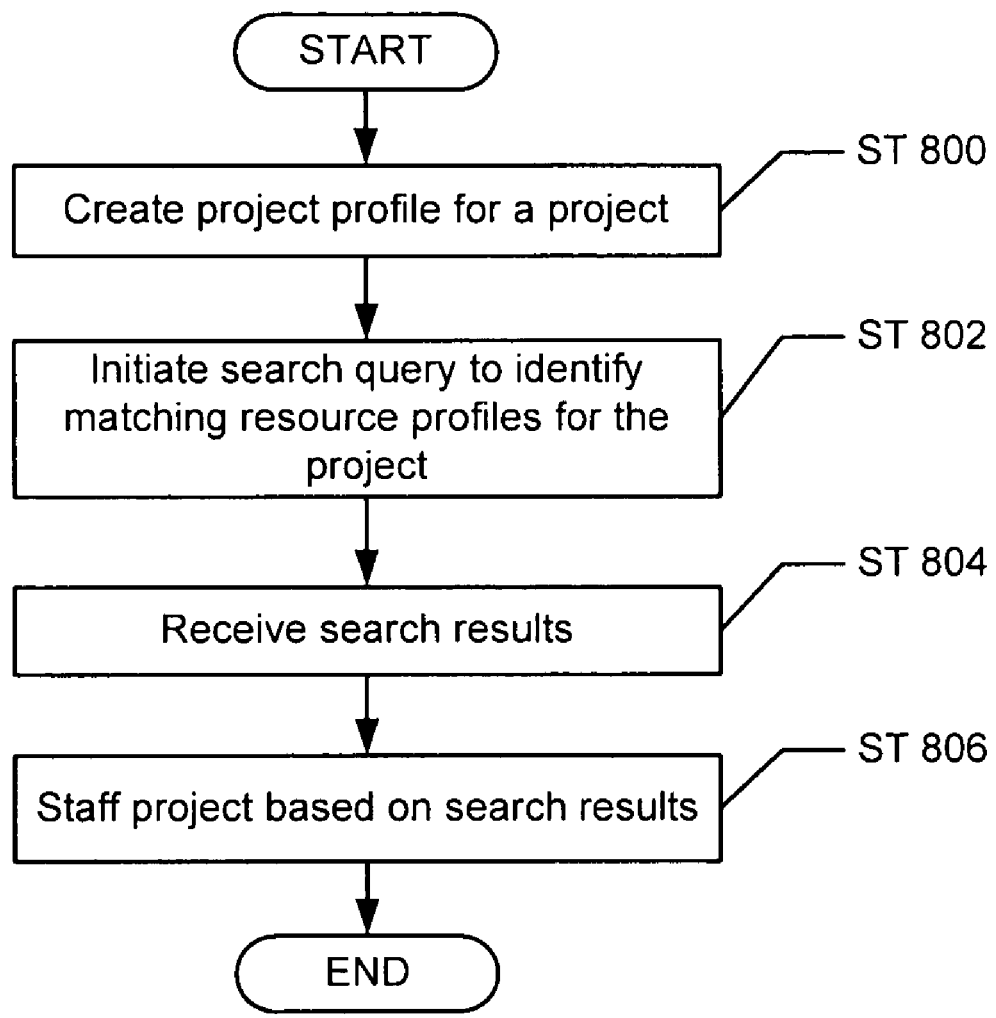

FIG. 8 shows a flowchart for staffing a project in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Accordingly, the specific arrangement of steps shown in FIG. 8 is not meant to limit the scope of the invention.

Specifically, FIG. 8 shows a flow chart from the perspective of a manager and/or developer submitting a project staffing request. Initially, a project profile for the project to be staffed is created (ST 800). The project profile may include a project name and/or a project identifier, the technology area of the project, and the project duration, if the aforementioned information is known. The remaining information in the project profile may be blank until after staffing selections for the project are made. Alternatively, in one or more embodiments of the invention, a project profile may be created after staffing selections are made. In this case, the system, based on the profiles that are selected for staffing on the project, may automatically create a project profile and include all the information based on the staffing selections made for the project in the project profile.

Subsequently, a search query to identify resources for the project is initiated (ST 802). For example, the search query may be initiated by inputting known project attributes into a user interface and clicking/selecting a search button that triggers the system to begin a search for matching profiles. Next, the search results are received (ST 804). Based on the search results, project staffing selections are made (ST 806).

In one or more embodiments of the invention, a selection of resource profiles may be performed using any criteria and/or priority among the various user data that may be contained in a user profile. For example, suppose a manager would like to staff a new project with employees who are interested in a new technology area, rather than employees that have experience in the particular technology area of the project. In this case, the manager can select user profiles that include the technology area in the areas of interest portion of the user profile. Furthermore, the manager may select users based on interest and if the users do not have the availability for the project duration, the manager may send a message to the user requesting the user to modify his/her project schedule to accommodate the new project. Alternatively, consider a scenario in which a manager is focused on time frame, and prefers users that are completely free to work on the new project for the project duration. In this case, the manager may select the user profiles that include availability for the project, without regard to experience and/or interest in the project or technology area of the project. Thus, embodiments of the invention allow for a robust staffing method that permits different data specified in user profiles to match a project staffing request.

Embodiments of the invention provide and system and method for automatically identifying resources for a project, without having to assign resources to the project. More specifically, embodiments of the invention provide a method to match skill set, interest, performance, and any combination thereof to a project, where the matching of information occurs across divisions, departments, and business units of an organization. Such robust matching allows for the best resources to be staffed on a project, based on how management would like to staff the project. For example, suppose a manager is aware that Project X has a high level of difficulty. In this case, the manager would probably want to staff those individuals that have the most experience and the most time to devote to the project. On the other hand, if a project is relatively easy, the manager may be more inclined to select resources that are interested in the project, rather than those that have experience in the area of technology of the project. Further, embodiments of the invention dynamically update project-related information, such as user profiles and project profiles, based on a new staffing selection and as project information associated with a project changes. For example, as resources are staffed on new projects, the resource profiles may be automatically modified to include the technology area, time frame, and project identifiers for the new projects. Alternatively, in one or more embodiments of the invention, as projects are developed and worked on, attributes of the project may be updated in the corresponding project profiles.

Figure 9:
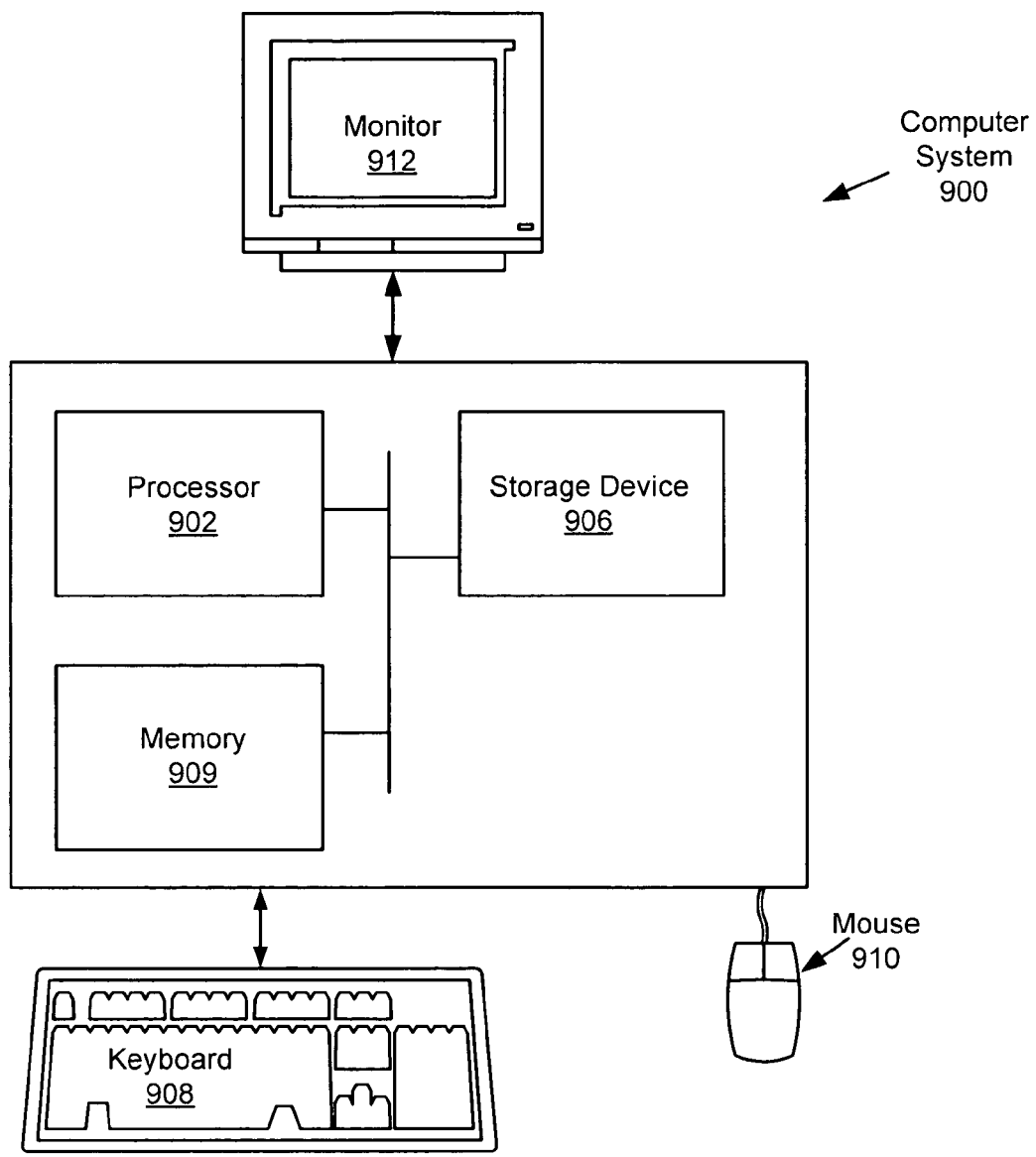
FIG. 9 shows a computer system in accordance with one or more embodiments of the invention.

Embodiments of the invention may be implemented on virtually any type of computing device regardless of the platform being used. For example, as shown in FIG. 9, a computer system (900) includes one or more processor(s) (902), associated memory (909) (e.g., random access memory (RAM), cache memory, flash memory, etc.), a storage device (906) (e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). Those skilled in the art will appreciate that the input and output means may take forms now known or later developed. The computer system (900) may be connected to a network (919) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (900) includes at least the minimal processing, input, and/or output means necessary to practice embodiments of the invention.

Further, those skilled in the art will appreciate that one or more elements of the aforementioned computer system (900) may be located at a remote location and connected to the other elements over a network. Further, software instructions to perform embodiments of the invention may be stored on any tangible computer readable medium such as a compact disc (CD), a diskette, a tape, or any other suitable tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for assigning resources to a project comprising:
   receiving, using a processor, a request to assign the resources to the project, wherein the request comprises a technology area and a timeline of the project, and wherein the project is a task to be completed internally by an organization;
   creating a project profile associated with the project, wherein the project profile comprises the technology area and the timeline of the project;
   matching a user availability timeline stored in each of a set of user profiles to the timeline of the project, wherein each of the set of user profiles stores a user interest and a user priority for the user interest;
   determining a level of difficulty for the project;
   when the level of difficulty for the project is below a threshold, matching the user interest stored in each of a subset of user profiles in the set of user profiles to the technology area of the project;
   when the level of difficulty for the project is above or equal to the threshold, matching a user experience stored in each of the subset of user profiles in the set of user profiles to the technology area of the project;
   automatically searching, using the processor, a plurality of physical resource profiles to identify a subset of physical resource profiles from the plurality of physical resource profiles, wherein each of the subset of physical resource profiles stores physical resource data matching the technology area and the timeline of the project;
   displaying, using the processor, the subset of user profiles and the subset of physical resource profiles;
   receiving, by the processor, a first selection of at least one user profile from the subset of user profiles and a second selection of at least one physical resource profile from the subset of physical resource profiles;

assigning, based on the first selection and the second selection, at least one user and at least one physical resource to the project; and populating the project profile after receiving the first selection and the second selection, wherein populating the project profile comprises adding at least one selected from a group consisting of a project identifier that uniquely identifies the project, a project member comprising the at least one user, a project manager, the at least one physical resource, and the timeline of the project.

2. The method of claim 1, further comprising:

updating the at least one user profile selected to include information associated with the project.

3. The method of claim 1, wherein the plurality of user profiles is stored in an internal database of the organization, and a plurality of users is associated with the plurality of user profiles, and wherein each of the plurality of users is one selected from a group consisting of an employee of the organization and an independent contractor.

4. The method of claim 1, wherein a first user profile of the subset of user profiles is associated with a first user employed in a first department in the organization, and a second user profile of the subset of user profiles is associated with a second user employed in a second department in the organization.

5. The method of claim 1, further comprising evaluating performance review data stored in each of the subset of user profiles.

6. A system for assigning resources to a project, comprising:

a repository configured to store, on behalf of an organization, a plurality of user profiles comprising user data, and a plurality of project profiles comprising project data; and a server communicatively coupled to the repository and configured to:

receive a request to assign the resources to the project from the organization, wherein the request comprises a technology area and a timeline of the project, and wherein the project is a task to be completed internally by the organization;

create a project profile associated with the project, wherein the project profile comprises the technology area and the timeline of the project match a user availability timeline stored in each of a set of user profiles to the timeline of the project, wherein each of the set of user profiles stores a user interest and a user priority for the user interest;

determine a level of difficulty for the project;

when the level of difficulty for the project is below a threshold, matching the user interest stored in each of a subset of user profiles in the set of user profiles to the technology area of the project;

when the level of difficulty for the project is above or equal to the threshold, matching a user experience stored in each of the subset of user profiles in the set of user profiles to the technology area of the project;

automatically search a plurality of physical resource profiles to identify a subset of physical resource profiles from the plurality of physical resource profiles, wherein each of the subset of physical resource profiles stores physical resource data matching the technology area and the timeline of the project;

display the subset of user profiles and the subset of physical resource profiles;

receive a first selection of at least one user profile from the subset of user profiles and a second selection of at least one physical resource profile from the subset of physical resource profiles;

assign, based on the first selection and the second selection, at least one user and at least one physical resource to the project; and populate the project profile after receiving the first selection and the second selection, wherein populating the project profile comprises adding at least one selected from a group consisting of a project identifier that uniquely identifies the project, a project member comprising the at least one user, a project manager, the at least one physical resource, and the timeline of the project;

wherein the server is remotely accessed by the organization to assign the resources to the project.

7. The system of claim 6, wherein the server is further configured to:

update the at least one user profile selected to include information associated with the project.

8. The system of claim 6, wherein the plurality of user profiles are stored in an internal database of the organization, and a plurality of users is associated with the plurality of user profiles, and wherein each of the plurality of users is one selected from a group consisting of an employee of the organization and an independent contractor.

9. The system of claim 6, wherein the server is configured to send a message notifying a user associated with the at least one user profile that the user has been assigned to the project.

10. The system of claim 6, wherein a first user profile of the subset of user profiles is associated with a first user employed in a first department in the organization, and a second user profile of the subset of user profiles is associated with a second user employed in a second department in the organization.

11. The system of claim 6, wherein the server is further configured to evaluate performance review data stored in each of the subset of user profiles.

12. The system of claim 6, wherein the request further comprises a previous project identifier, and wherein the user data stored in the at least one user profile further matches the previous project identifier.

13. A non-transitory computer readable medium comprising software instructions executed by a processor to:

receive a request to assign resources to a project, wherein the request comprises a technology area and a timeline of the project, and wherein the project is a task to be completed internally by an organization;

create a project profile associated with the project, wherein the project profile comprises the technology area and the timeline of the project;

match a user availability timeline stored in each of a set of user profiles to the timeline of the project, wherein each of the set of user profiles stores a user interest and a user priority for the user interest;

determine a level of difficulty for the project;

when the level of difficulty for the project is below a threshold, matching a user interest stored in each of a subset of user profiles in the set of user profiles to the technology area of the project;

when the level of difficulty for the project is above or equal to the threshold, matching a user experience stored in each of the subset of user profiles in the set of user profiles to the technology area of the project;

automatically search a plurality of physical resource profiles to identify a subset of physical resource profiles from the plurality of physical resource profiles, wherein each of the subset of physical resource profiles stores physical resource data matching the technology area and the timeline of the project;

display the subset of user profiles and the subset of physical resource profiles;

receive a first selection of at least one user profile from the subset of user profiles and a second selection of at least one physical resource profile from the subset of physical resource profiles;

assign, based on the first selection and the second selection, at least one user and at least one physical resource to the project; and populate the project profile after receiving the first selection and the second selection, wherein populating the project profile comprises adding at least one selected from a group consisting of a project identifier that uniquely identifies the project, a project member comprising the at least one user, a project manager, the at least one physical resource, and the timeline of the project.

14. The computer readable medium of claim 13, further comprising software instructions to evaluate performance review data stored in each of the subset of user profiles.

15. The computer readable medium of claim 13, wherein the request further comprises a previous project identifier, and wherein the user data stored in the at least one user profile further matches the previous project identifier.

* * * * *